United States Patent [19]
Wakui et al.

[11] Patent Number: 5,146,373
[45] Date of Patent: Sep. 8, 1992

[54] INFORMATION SIGNAL REPRODUCING APPARATUS WITH FUNCTION OF DETECTING TRACK PITCH

[75] Inventors: Tetsuya Wakui, Chiba; Nobutoshi Takayama, Kanagawa; Katsuji Yoshimura, Kanagawa; Kenichi Nagasawa, Kanagawa, all of Japan

[73] Assignee: Canon Kabushiki Kaisha, Tokyo, Japan

[21] Appl. No.: 639,417

[22] Filed: Jan. 10, 1991

Related U.S. Application Data

[62] Division of Ser. No. 223,565, Jul. 25, 1988, abandoned.

[30] Foreign Application Priority Data

| Jul. 31, 1987 | [JP] | Japan | 62-191866 |
| Jul. 31, 1987 | [JP] | Japan | 62-191867 |
| Jul. 31, 1987 | [JP] | Japan | 62-191868 |
| Jul. 31, 1987 | [JP] | Japan | 62-191870 |
| Jul. 31, 1987 | [KP] | D.P.R. of Korea | 62-191869 |

[51] Int. Cl.⁵ .............................................. G11B 5/584
[52] U.S. Cl. ............................ 360/77.01; 360/73.06; 360/73.07; 360/77.14
[58] Field of Search ........... 360/10.2, 70, 73.05–73.07, 360/77.01–77.16, 10.1, 10.3; 369/43, 44.25, 44.32

[56] References Cited

U.S. PATENT DOCUMENTS

| 4,558,382 | 12/1985 | Edakubo et al. | 360/10.2 |
| 4,679,099 | 7/1987 | Edakubo | 360/10.2 |
| 4,691,256 | 9/1987 | Kozuki et al. | 360/73.06 |
| 4,714,970 | 12/1987 | Edakubo | 360/73.06 |
| 4,814,900 | 3/1989 | Nemoto et al. | 360/73.05 |
| 4,875,115 | 10/1989 | Yokosawa | 360/77.15 |
| 4,916,554 | 4/1990 | Takahashi et al. | 360/10.2 |
| 5,003,414 | 3/1991 | Yokosawa | 360/77.15 |

Primary Examiner—Aristotelis M. Psitos
Assistant Examiner—Steven R. Garland
Attorney, Agent, or Firm—Robin, Blecker, Daley & Driscoll

[57] ABSTRACT

An apparatus for reproducing an information signal from a recording medium on which many tracks are formed, by periodically tracing the recording medium with a recording head. The position of the reproducing head relative to the recording medium is controlled on the basis of a tracking error signal which is obtained from the signals reproduced by the reproducing head. The track pitch is determined by a discrimination of a binary signal which is formed on the basis of a determination of whether the tracking signal is within a predetermined range.

7 Claims, 7 Drawing Sheets

INFORMATION SIGNAL REPRODUCING APPARATUS WITH FUNCTION OF DETECTING TRACK PITCH

This is a divisional application under 37 CFR 1.62 of prior application Ser. No. 223,565, filed Jul. 25, 1988, now abandoned.

BACKGROUND OF THE INVENTION

1. Field of the Invention

This invention relates to an information signal reproducing apparatus and more particularly to an apparatus for reproducing an information signal by periodically tracing, with a reproducing head, a recording medium on which pilot signals of n kinds (n: an integer which is at least 3) having different frequencies are recorded along with the information signal, in a cycle of n tracks, in many tracks formed in parallel with each other.

2. Description of the Related Art

Some of so-called rotary two-head helical scanning type video tape recorders (VTRs) of the above stated kind are arranged to perform tracking control in accordance with a so-called four-frequency method. In the following description of this specification, the VTR of this kind will be described by way of example.

The four-frequency method for tracking control enables the VTR to detect a tracking error without recourse to the use of a fixed head. The method is advantageous also in that a tracking error signal which is thus obtained shows an actual relation between the information signal and the recording tracks. Therefore, the four-frequency tracking control method is considered highly suited for rotary-head type recording/reproducing apparatuses typically represented by the VTR.

Meanwhile, the VTR is generally arranged to be capable of setting any of at least two different track pitches in recording. In cases where recording and reproduction with a high picture quality are desired by the operator, recording and reproduction are performed in a so-called standard mode (hereinafter referred to as the SP mode) which gives a wide track pitch. In case that continuous recording over a long period of time on a single coil of tape is required, recording and reproduction are performed in a so-called long-time mode (hereinafter referred to as the LP mode) which gives a narrow track pitch.

With the VTR thus arranged to be capable of setting any of a plurality of track pitches, it is necessary in performing reproduction to automatically detect the recording track pitch and to adjust the tape transport speed, etc., to the recording track pitch detected.

For the VTR of the kind performing the four-frequency type tracking control, various methods have been proposed and put into practice for discriminating the track pitch of the recording medium by utilizing the pilot signals reproduced. For example, U.S. Pat. Nos. 4,691,256 and 4,714,970 etc. have disclosed such methods. In discriminating the track pitch with the VTR of the kind performing the four-frequency type tracking control, however, the discriminating action might become inaccurate as it is apt to be affected by inadequate linearity of the tracks, the drop-out of a reproduced signal, etc. Therefore, for increased reliability, discrimination signals must be statistically processed. However, this necessitates an excessively long period of time for the discriminating action.

Besides, in the apparatus of this kind, the state of tracking control is not easily surmisable. An attempt to enable the apparatus to make the above stated discrimination within a short period of time, therefore, tends to increase the possibility of erroneous detection.

Further, unevenness in the degree of mechanical precision between one unit of the apparatus and another causes some delicate differences in the tracing state of the head among different units. This has caused either an erroneous discrimination or inability to discriminate.

It has been another problem that, in the event of a reproducing operation on a recording medium, or tape, which has its track pitch change from one pitch to another at some intermediate point thereof, a signal reproduced deteriorates over a long period of time, because: It is extremely difficult, in connection with the above stated variable factors, to analyze how the tape is moved under the tracking control during the track pitch discriminating action.

In the VTR performing the four-frequency type tracking control, the level of a tracking error signal becomes low when the extent of a tracking error is close to the distance of two track pitches. Under such a condition, it becomes difficult to obtain a tracking-locked state in a short time. (Hereinafter this condition will be called a back lock state.) To solve this problem, it has been practiced to quickly obtain a tracking-locked state by shifting the track under control (controlling track) to the extent of two tracks. For this purpose, the VTR is preferably arranged to be capable of shifting the controlling track upon detection of the above stated back lock state as well as effecting change-over from one reproduction mode to another as necessary upon detection of the track pitch. However, for performing both of these actions, the conventional VTR is arranged to perform the two different detecting actions separately from each other. Therefore, the conventional arrangement has necessitated use of two different detecting circuits and thus resulted in a complex circuit arrangement.

SUMMARY OF THE INVENTION

It is a general object of this invention to solve the above stated problems of the prior art.

It is a more specific object of the invention to provide an information signal reproducing apparatus which is capable of promptly and accurately discriminating the pitch of tracks by using pilot signals recorded along with an information signal.

Under this object, an apparatus arranged as an embodiment of this invention to reproduce an information signal from a recording medium on which pilot signals of n kinds (n: an integer which is at least 3) having different frequencies are recorded along with the information signal, in a cycle of n tracks, in many tracks formed on the recording medium comprises: reproducing means including a reproducing head which is arranged to periodically trace the recording medium; transport means for transporting the recording medium in the direction of crossing the tracks; detecting means for detecting a tracking error of the reproducing head by using the pilot signals reproduced by the reproducing means; discriminating means for discriminating, for every tracing period of the reproducing head, whether the extent of the tracking error is within a given range, said discriminating means being arranged to generate a binary signal indicating the result of the discrimination; determining means for determining whether a generation pattern of binary signals generated continuously timewise by the discriminating means coincides with a given pattern; and change-over means for changing a transporting speed at which said transport means transports the recording medium from one speed over to another on the basis of the result of determination made by the determining means.

It is another object of the invention to provide a reproducing apparatus which permits simplification of a circuit arrangement required for change-over of a recording medium transporting speed according to the pitch of recording tracks and change-over of a track under control from one track to another.

Under that object, an apparatus arranged as another embodiment of this invention to reproduce an information signal from a recording medium on which pilot signals of n kinds (n: an integer which is at least 3) having different frequencies are recorded along with the information signal, in a cycle of n tracks, in many tracks formed on the recording medium comprises: reproducing means including a reproducing head which is arranged to periodically trace the recording medium; transport means for transporting the recording medium in the direction of crossing the tracks; detecting means for detecting a tracking error of the reproducing head by using the pilot signals reproduced by the reproducing means; generating means for generating a binary signal which indicates whether or not the extent of the tracking error is within a given range; tracking control means for controlling the position of the reproducing head and that of the recording medium relative to each other on the basis of the tracking error detected by the detecting means; determining means for determining a track pitch in the tracks by using the binary signal; and shifting means for shifting a track for which the tracking error of the reproducing head is to be detected by the detecting means according to the binary signal.

The above and further objects and features of this invention will become apparent from the following detailed description of embodiments thereof taken in connection with the accompanying drawings.

DETAILED DESCRIPTION OF THE PREFERRED EMBODIMENT

Figure 1:
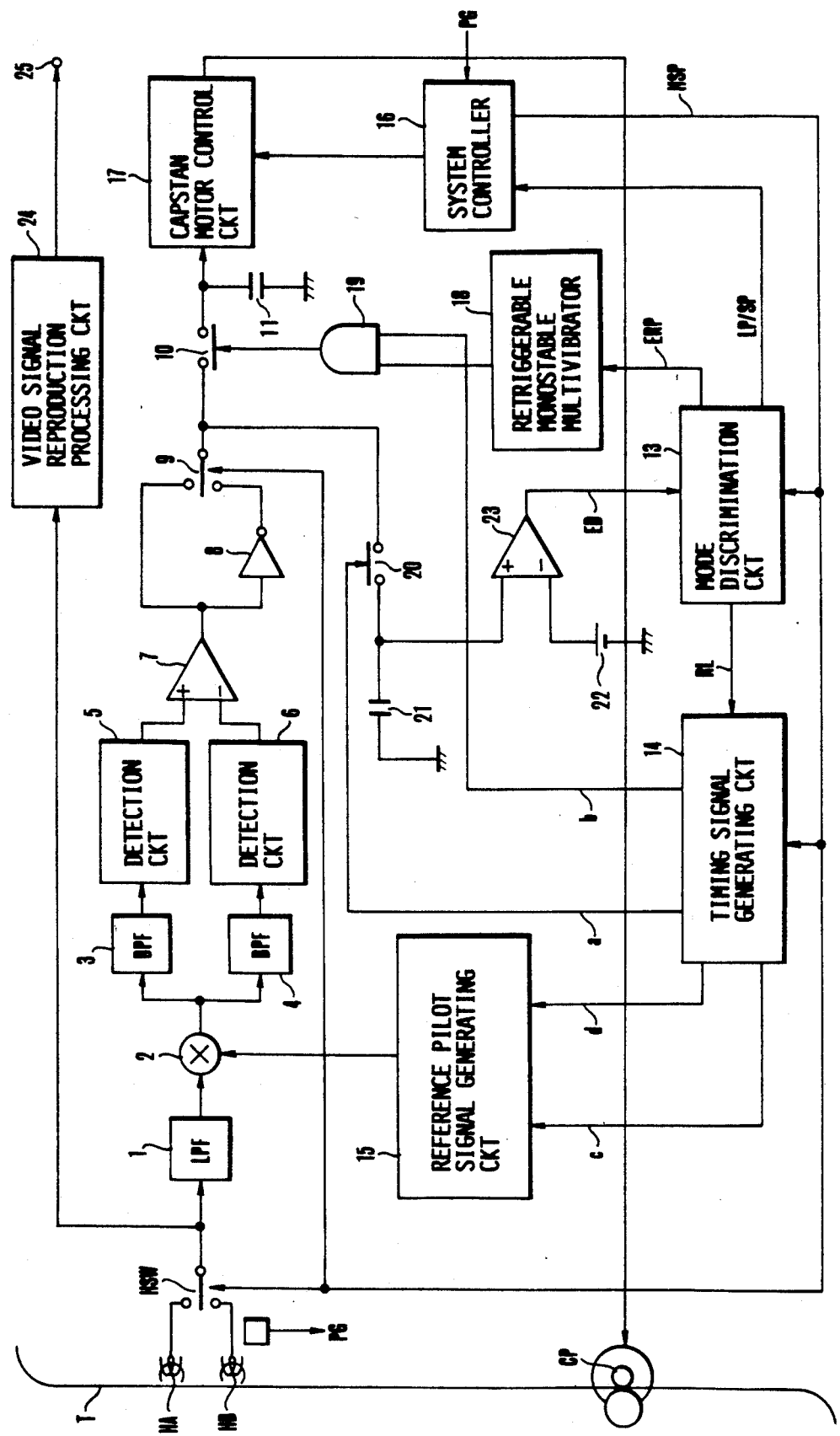
FIG. 1 is a block diagram showing in outline the reproduction system of a VTR arranged as an embodiment of this invention.
Figure 2:
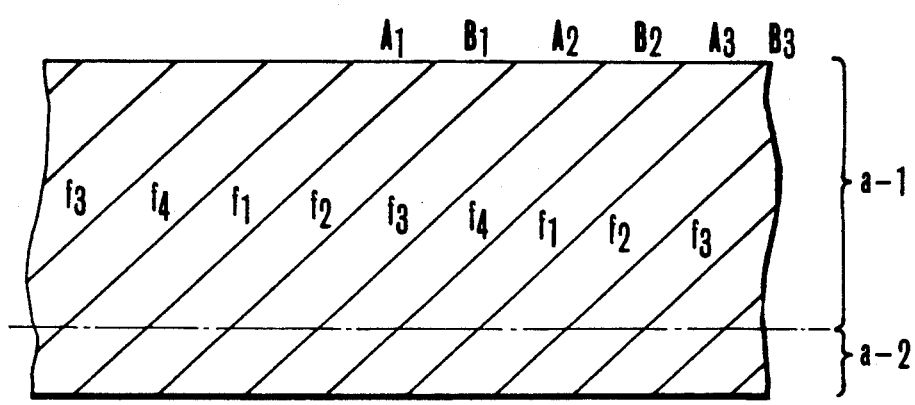
FIG. 2 is an illustration of a record pattern obtained on a tape to be reproduced by the VTR of FIG. 1.

The details of a VTR which is arranged as an embodiment of this invention are described as follows: FIG. 1 is a block diagram showing in outline the arrangement of the VTR. FIG. 2 shows a record pattern obtained on a magnetic tape on which an information signal to be reproduced by the VTR of FIG. 1 is recorded. Referring to FIG. 2, reference symbols f1, f2, f3 and f4 denote the frequencies of pilot signals recorded in a multiplexed manner in tracks shown in a parallelogramic shape. Symbols A1, B1, A2, B2, etc. denote track numbers respectively. Further, as well known, one field portion of a video signal is recorded in each of the tracks. The track pitch can be set in two kinds. The track pitch of the SP mode is arranged to be twice as long as that of the LP mode.

Referring to FIG. 1, rotary heads HA and HB are arranged to rotate at a phase difference of 180 degrees from each other. They have different azimuth angles. Signals reproduced by the heads HA and HB are supplied to a head switch HSW to be combined into a continuous signal. The continuous signal which is produced from the head switch HSW is supplied to a low-pass filter (LPF) 1. The above stated pilot signal component is separated from the continuous signal by the LPF 1. Meanwhile, the continuous signal is supplied also to a video signal reproduction processing circuit 24. After undergoing a known signal processing operation, the continuous signal is produced from an output terminal 25 as a reproduced video signal.

The pilot signal separated by the LPF 1 is supplied to an analog multiplier 2 and is multiplied by a reference pilot signal which is produced from a reference pilot signal generating circuit 15. Assuming that the pilot signals are recorded in the order of frequencies f1, f2, f3, f4, --- at the time of recording as shown in FIG. 2, the reference pilot signal generating circuit 15 produces reference pilot signals in the same order of frequencies f1, f2, f3, f4, ---. Further, when the reproducing head is tracing an area a-1 shown in FIG. 2, the circuit 15 produces a reference pilot signal of the same frequency as that of a pilot signal recorded in a mainly reproduced track, i.e. a track under control or a controlling track. When the reproducing head is tracing an area a-2 of FIG. 2, the circuit 15 produces a reference pilot signal of the same frequency as that of a pilot signal recorded in a track located right before the controlling track. In other words, the reference pilot signal change-over timing is delayed from the timing of reproducing head change-over. In the following description, the reproduced pilot signals of the frequencies f1, f2, f3 and f4 will be referred to as reproduced pilot signals f1, f2, f3 and f4, and the reference pilot signals of the frequencies f1, f2, f3 and f4 as reference pilot signals F1, F2, F3 and F4 for the sake of simplification of description.

The multiplier 2 produces a signal including a difference component representing a difference between the reproduced pilot signal and the reference pilot signal. Assuming that there obtains a relation of $f4-f1=f3-f2=3fH$ (fH: the horizontal scanning frequency of the video signal) and $f2-f1=f3-f4=fH$, the extent of a tracking error obtained when the reproducing head is tracing the area a-1 is detectable, as well known, from a difference between a 3fH component and a fH component. Band-pass filters (BPFs) 3 and 4 are respectively arranged to separate the 3fH and fH components from the signal produced by the multiplier 2. The outputs of the BPFs 3 and 4 are supplied to detection circuits 5 and 6. The outputs of the detection circuits 5 and 6 are supplied to a differential amplifier 7, which then gives the above stated difference component. The output of the differential amplifier 7 is inverted, as well known, every time the controlling track is changed from one track over to another if the direction of the &racking error is unvarying. Therefore, the polarity of signals can be determined by a circuit which is composed of an inverter 8 and a switch 9 which operates under the control of a head switching pulse (hereinafter referred to as pulse HSP). With the signal polarity thus determined, a signal (hereinafter referred to as ATF signal) which indicates the extent or degree and the direction of the tracking error is obtained from the switch 9.

When the apparatus is set either in the SP mode or in the LP mode, a system controller 16 produces the above stated pulse HSP on the basis of a rotary head rotation detection signal (hereinafter referred to as PG signal) which is produced by detecting the rotation of the rotary head. A timing signal generating circuit 14 is arranged to generate various timing pulse signals on the basis of the pulse HSP.

Figure 3:
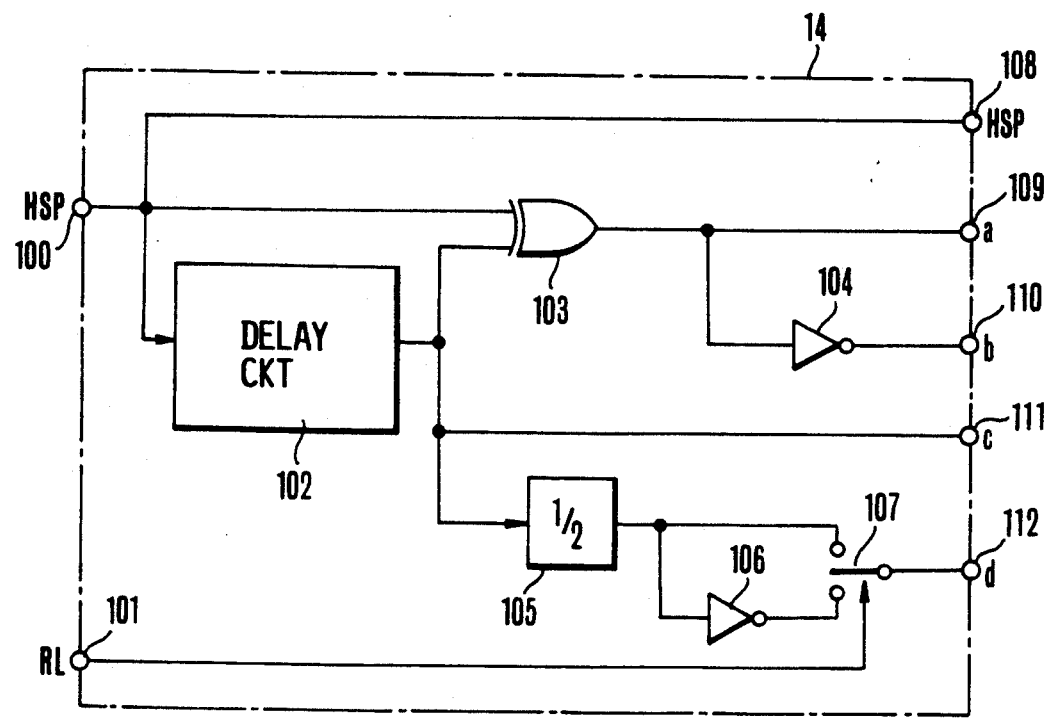
FIG. 3 is a circuit diagram showing the details of a timing signal generating circuit included in FIG. 1.
Figure 4:
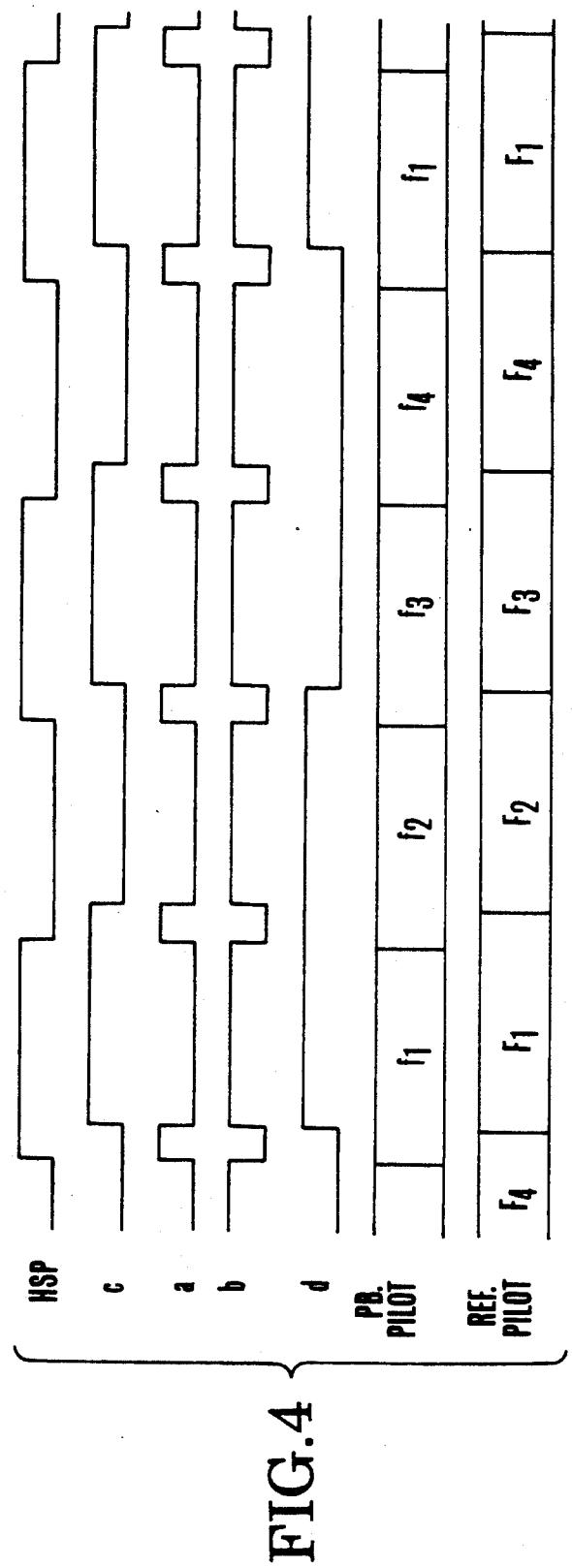
FIG. 4 is a timing chart showing signals generated by the circuit of FIG. 3.

FIG. 3 shows the details of the arrangement of the timing signal generating circuit 14. FIG. 4 is a timing chart showing the timing signals generated by the timing signal generating circuit 14. Referring to FIG. 3, a terminal 100 is arranged to receive the pulse HSP. The pulse HSP is supplied to a delay circuit 102. The delay circuit 102 then gives a timing pulse signal as shown at a part c of FIG. 4. The timing pulse c is produced from a terminal 111. The delay circuit 102 can be composed of, for example, a D flip-flop which is arranged to operate according to a clock signal of a frequency which is several times as high as that of the pulse HSP. The pulse c is supplied to an exclusive OR circuit 103 together with the pulse HSP. The circuit 103 then gives a timing pulse which is as shown at a part a of FIG. 4. A pulse b is obtained by inverting the pulse a. The pulses a and b are produced from terminals 109 and 110. Further, the pulse c is supplied also to a ½ frequency divider 105. The output of the frequency divider 105 and a signal obtained by inverting this output by means of an inverter 106 are selectively produced through a switch 107. The output of the switch 107 is produced from a terminal 112 as a pulse d.

The pulses c and d are supplied to the reference pilot signal generating circuit 15. This causes the circuit 15 to produce the reference pilot signals at a timing which is as shown at a part REF. PILOT of FIG. 4. In FIG. 4, a part PB. PILOT shows the pilot signals reproduced from the controlling tracks.

The pulse signal b is arranged to control a switch 10 via an AND gate 19 to gate only the ATF signal which is obtained at the timing of reproduction from the area a-1. A capacitor 11 is arranged to maintain the level of the ATF signal obtained immediately before when the switch 10 is in an open state. This signal is supplied to a capstan motor control circuit 17 for control over a capstan CP. By virtue of this, the transport of a tape T is controlled to enable the heads HA and HB to accurately trace the tracks.

The pulse signal a is supplied to the control terminal of a switch 20 to allow only the ATF signal that is obtained at the timing of reproduction from the area a-2 to be gated by the switch 20. The ATF signal thus gated by the switch 20 is a signal obtained by inverting the ATF signal produced for a track immediately preceding the currently controlling track. Therefore, this signal is at a positive level when the head is accurately tracing a desired track or when the extent of the tracking error does not exceed one track pitch. A capacitor 21 is arranged to maintain a signal level obtained immediately before when the switch 20 is in an open state. A voltage source 22 is arranged to produce a DC voltage which is at about zero level and varies according to the unevenness among different units of the apparatus. A comparator 23 is arranged to produce a binary signal ED at a high level (1) when the tracking error is within one track pitch and at a low level (0) when the tracking error exceeds one track pitch. In actuality, the controlling track periodically exits at every four tracks. Therefore, the signal ED is at "1" when the extent of the tracking error is close to a 4X-th track (X: a natural number) and at "0" when the extent of the tracking error is close to a (4X+2)-th track.

Figure 5:
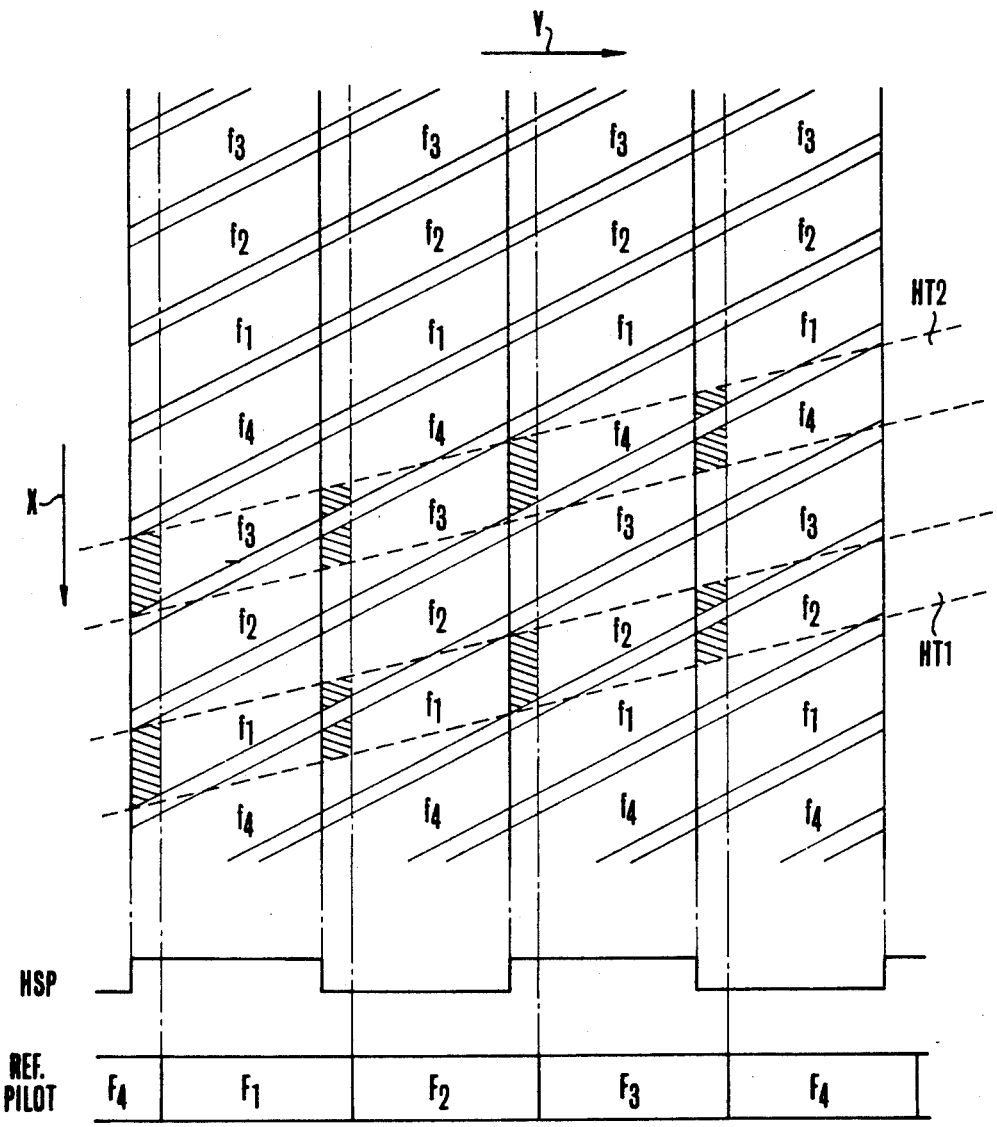
FIG. 5 is a schematic illustration of a reproducing operation performed in the LP mode on a tape on which signals were recorded in the SP mode.

The arrangement of this embodiment is characterized by a mode discrimination circuit 13. The mode discrimination circuit 13 operates as follows:

FIG. 5 schematically shows a reproducing operation performed in the LP mode on a tape which has signals recorded in the SP mode. Referring to FIG. 5, the axis of ordinate shows the position of the head relative to a surface of revolution and the axis of abscissa a time base. An arrow X denotes the travelling direction of the tape. An arrow Y denotes the revolving direction of the heads. Reference symbols HT1 and HT2 denote the tracing loci of the heads, which are continuous. Further, hatched parts represent parts from which reproduced pilot signals are obtained from the area a-2.

If the reference pilot signals are of the kinds as shown at a part REF. PILOT of FIG. 5, the level of the binary signal ED obtained following the tracing loci HT1 and HT2 changes in the order of "1", "1", "?", "0", "0", "0", "?", "1". Here, "?" indicates an undetermined state between "0" and "1". Considering this further, in the reproduction in the LP mode of signals recorded in the SP mode, the generation patterns of the binary signal ED corresponding to tracing eight times by the heads for reproduction become the following three patterns, with the patterns assumed to remain unchanged by mere shifting:

| |
|---|
| 0, 0, 1, 1, 1, 1, 0, 0 |
| 0, 0, 1, 1, 1, 0, 0, 0 |
| 0, 0, 1, 1, 1, 1, 1, 0 |

Therefore, detection of the generation of these patterns permits confirmation that the apparatus is performing reproduction in the LP mode on the signal recorded in the SP mode. Then, generation of such patterns that are obtained by shifting these detection patterns also can be regarded as indicative of reproduction in the LP mode of the signal recorded in the SP mode. In view of this, therefore, all these patterns including such shifted patterns may be used as detection patterns. However, since the patterns always come to coincide with the above stated three patterns within several fields in any case, detection of these three patterns suffices. In the case of this specific embodiment, therefore, the VTR is arranged to detect only the above stated three patterns.

The selection of these detection patterns has another point of significance. These patterns begin with "0" and end with "0". This bears an important meaning in terms of prevention of erroneous detection. In other words, in case that the recording mode coincides with the reproduction mode, the pattern has "0" at the beginning thereof. However, such a pattern may be also generated in case where the head is shifted to a tracking drawn-in state from a state of having a tracking error exceeding the extent of one track. Meanwhile, a pattern having "1" at the beginning thereof is generated in cases where the recording mode changes from one mode over to another halfway on the tape or at a concatenated recording part of the tape.

Figure 6:
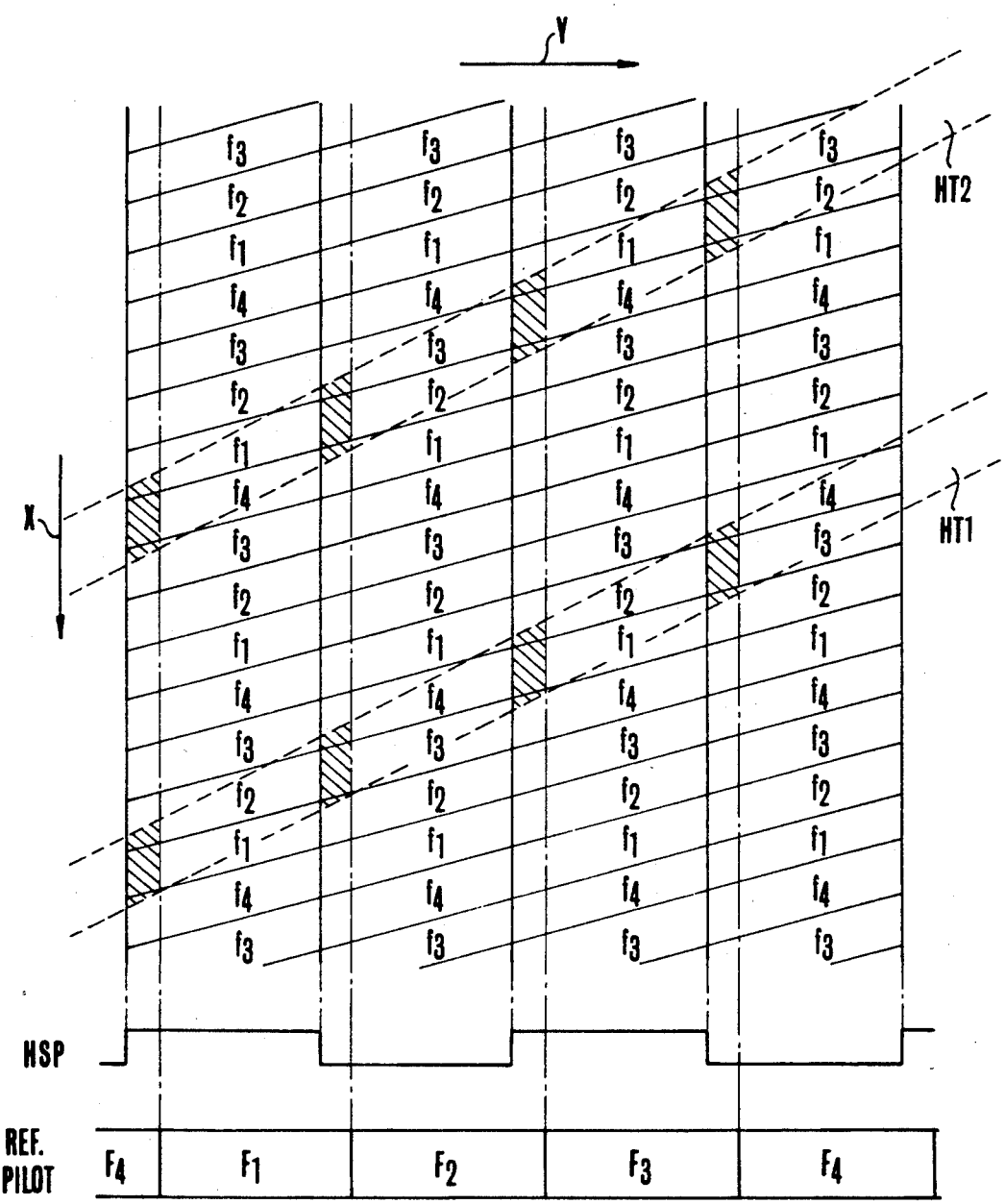
FIG. 6 is a schematic illustration of a reproducing operation performed in the SP mode on a tape on which signals were recorded in the LP mode.

FIG. 6 schematically shows reproduction in the SP mode of signals recorded in the LP mode on a tape. In FIG. 6, the same reference symbols as those of FIG. 5 denote the same things. If the reference pilot signals are of the kinds as shown at a part REF. PILOT of the drawing, the binary signal ED obtained following the tracing loci HT1 and HT2 varies in the order of "1", "?", "0", "?", "1", "?", "0" and "?". The symbol "?" denotes, like in the above stated case, an indeterminable state between "0" and "1". Considering this further, like in the case of FIG. 5, the generation patterns of the binary signal ED corresponding to tracing eight times by the head for reproduction in the SP mode of signals recorded in the LP mode become the following nine patterns, assuming that the patterns remain unchanged by mere shifting:

| | |
|---|---|
| 0, 1, 0, 0, 0, 1, 0, 0 | 0, 1, 0, 0, 0, 1, 1, 0 |
| 0, 1, 0, 0, 1, 1, 0, 0 | 0, 1, 0, 0, 1, 1, 1, 0 |
| 0, 1, 1, 0, 0, 1, 1, 0 | 0, 1, 1, 0, 1, 1, 0, 0 |
| 0, 1, 1, 0, 1, 1, 1, 0 | 0, 1, 1, 0, 0, 1, 1, 1 |
| 0, 1, 1, 1, 0, 1, 1, 1 | |

Therefore, reproduction in the SP mode of signals recorded in the LP mode is confirmable when the generation of these patterns are detected. Then, all the patterns that are obtained by shifting these patterns likewise may be regarded as detection patterns. However, in the case of this embodiment, only the above stated nine patterns are regarded as the detection patterns.

Further, the selection of these detection patterns bears the following meaning: The patterns always begin with "0". This avoids any possible misjudgement that the patterns are obtained while the eight states of the binary signal are not actually detected due to changes which frequently occur halfway on the tape in the recording mode thus requiring accurate discrimination.

Figure 7:
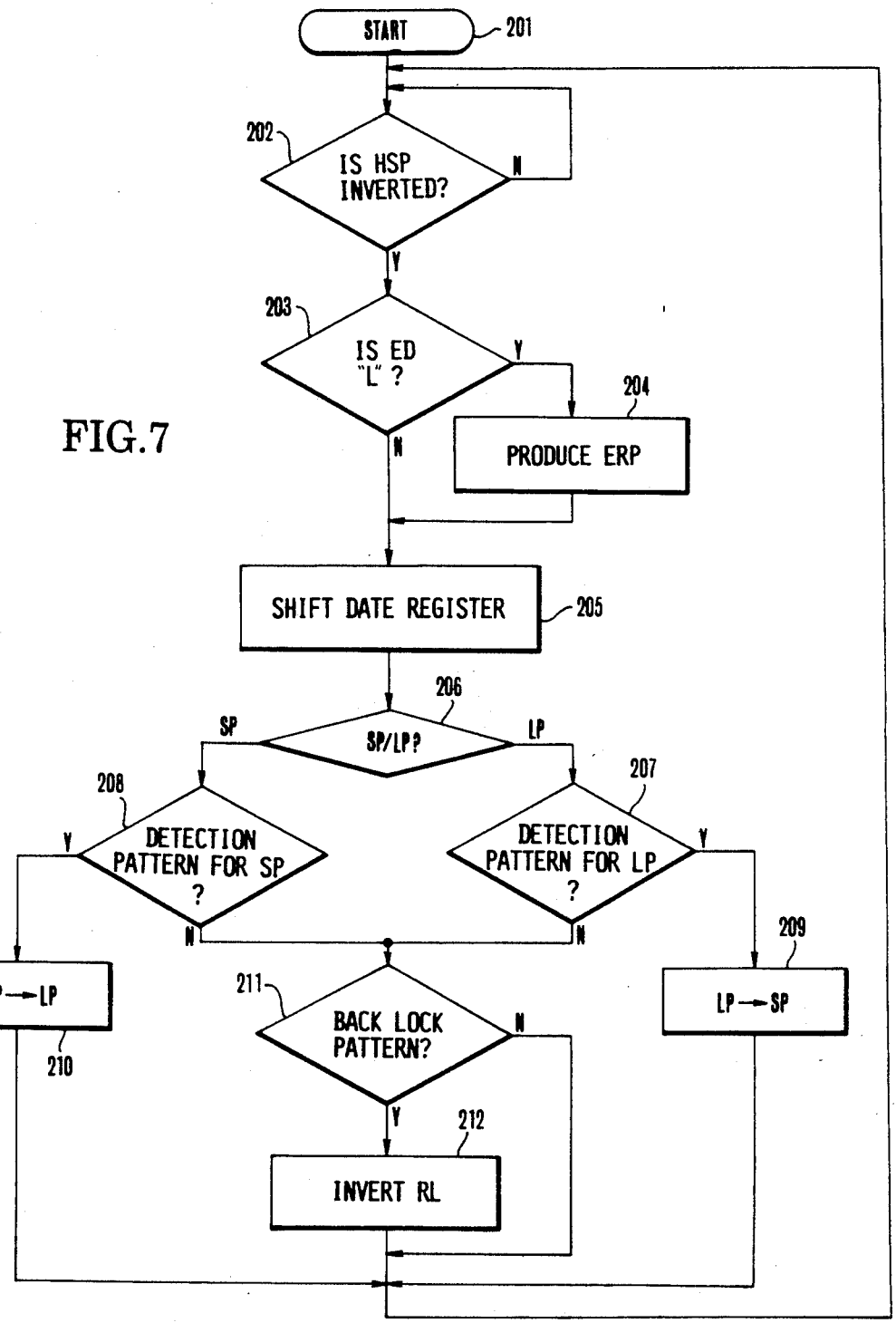
FIG. 7 is a flow chart showing the mode discriminating operation of the VTR of FIG. 1.

The mode discrimination circuit 13 consists of a microcomputer, etc. Referring to the flow chart of FIG. 7, the circuit 13 operates as follows: At a step 202, the inversion of the head switch pulse signal HSP is constantly monitored. After the inversion of the pulse signal HSP, the flow of operation proceeds to ensuing steps. At a step 203, a check is made to see if the binary signal ED produced from the comparator 23 is at a low level. If so, the flow comes to a step 204 to supply an error pulse ERP which indicates a tracking error exceeding one track to a retriggerable monostable multivibrator 18 which has its stable state at a low level. The stable period of the retriggerable monostable multivibrator 18 is arranged to be a period of several fields. Every time the tracking error of the head is determined to be exceeding one track pitch, the vibrator 18 is triggered. Therefore, the output level of the vibrator 18 becomes low when the tracking error periodically changes, i.e. when, for example, reproduction is being performed in a mode different from the mode employed in recording. Then, the low level output prevents the pulse signal b which is produced from the timing signal generating circuit 14 from being supplied to the switch 10. This disables the tracking control from being performed according to the ATF signal when a tracking error to an extent of two track pitches or thereabout continues over a long period of time, i.e. when a back lock state is detected, during a mode discriminating process performed at the ensuing steps. This is because, the tracking state of the head at the time of mode discrimination is unstable to prolong the period of time required for the mode discrimination or to make the discrimination difficult under the condition of having tracking control performed according to the ATF signal.

At a step 205: The binary signal ED is newly taken into data register disposed within the circuit 13. Then, the eight bits of the binary signal ED obtained during the period of eight fields are shifted one by one. At a step 206: A check is made for the mode currently selected by the system controller 16 between the SP and LP modes. Then, the flow proceeds either to a step 207 or to a step 208. At the step 207: The data of eight bits stored in the data register is checked for its coincidence with any of the above stated three generation patterns to be obtained when signals recorded in the SP mode are reproduced in the LP mode. If the data is found to coincide with one of them, the mode of the apparatus is changed from the LP mode to the SP mode. Further, at the step 208, the data of eight bits stored in the data register is checked for its coincidence with any of the above stated nine generation patterns to be obtained when signals recorded in the LP mode is reproduced in the SP mode. If the data is found to coincide with one of them, the mode of the apparatus is changed from the SP mode over to the LP mode. Following this changeover, the system controller 16 causes the capstan motor control circuit 17 to change the tape transport speed accordingly.

In case that the data of eight bits stored at the data register does not coincide with any of the above stated patterns, the flow proceeds to a step 211. At the step 211, a check is made for the back lock state. This state is found when either more than seven bits of the eight-bit data stored at the data register or all the eight bits are found to be at "0". If the VTR is found to be in the back lock state, the flow proceeds to a step 212 to invert the back lock detection pulse signal RL. As a result, the connecting position of the switch 107 of the timing signal generating circuit 14 is changed to shift the phase of the pulse signal d 180 degrees. Then, the generating rotation of the reference pilot signals is shifted by two steps. This causes the controlling track to be shifted by two tracks to bring the VTR into a tracking-locked state.

It has been ascertained by experiments and tests that the generating probability of the above stated mode discriminating patterns by the VTR of this embodiment is extremely high. Therefore, the VTR is capable of promptly and reliably changing the reproduction mode from one mode over to another. Further, the mode discriminating patterns are arranged to begin with a binary signal which is indicative of that the tracking error is not within a given range. This arrangement enables the VTR to exclude any patterns that tend to be generated at a concatenated recording part or the like with a minimum number of bits. Therefore, the mode discrimination can be promptly and accurately carried out for prompt and accurate change-over from one reproducing mode to another.

Further, the plurality of mode discriminating patterns are arranged to include all the patterns that are possibly generated as a result of mechanical unevenness among different VTR products. That arrangement also enables the VTR to promptly and accurately discriminate the track pitch even in the event of a recording medium which has been recorded by some other VTR. In other words, the VTR of the above stated embodiment is arranged to be capable of detecting all the patterns that are possibly generated in each of the cases where LP mode reproduction is performed on signals recorded in the SP mode and where SP mode reproduction is performed on signals recorded in the LP mode. This ensures prompt and reliable change-over from the LP mode to the SP mode and vice versa. Further, the VTR can be brought into a state of not performing tracking control when the track pitch is to be detected.

Therefore, track pitch is detectable while the recording medium is stably travelling. In other words, in the embodiment described, the pattern of eight bits to be compared with the mode discriminating patterns is generated when the tracking control on the basis of the ATF signal is not performed. Therefore, the pattern is never disturbed by an unstable travelling state of the tape, so that the reproduction mode can be promptly and reliably changed from one mode over to another.

Further, the signal for shifting the controlling track is used also in determining a tape transport speed for transporting the tape according to the track pitch. This permits simplification of the circuit arrangement. In other words, in the VTR of the embodiment described, the binary signal produced from the comparator 23 is analyzed by one and the same microcomputer both for changing the reproduction mode and for shifting the controlling track. This greatly simplifies the circuit arrangement to reduce the cost of the VTR and to facilitate mass production.

Further, while all the mode discriminating patterns are arranged to be consisting of eight bits, this is only for the advantageous use of general-purpose circuit elements. The number of bits of the patterns can be changed to any desired number. For example, the pattern to be used for determining that signals recorded in the SP mode are being reproduced in the LP mode may be arranged to be consisting of a minimum number of four bits. The pattern to be used for determining that signals recorded in the LP mode are being reproduced in the SP mode may be arranged to have a minimum number of eight bits. The back lock detecting pattern may be arranged to have only several bits.

What is claimed is:

1. An apparatus for reproducing an information signal from a recording medium on which many tracks are formed, comprising:
    (a) reproducing means for reproducing the information signal from the recording medium, said reproducing means including a reproducing head which is arranged to periodically trace said recording medium;
    (b) finding means for finding a tracking error of said reproducing head by using signals reproduced by said reproducing head;
    (c) tracking control means for controlling the position of said reproducing head relative to said recording medium on the basis of the tracking error currently found by said finding means;
    (d) detecting means for detecting whether the tracking error is within a predetermined range and for generating a binary signal indicative of the result of the detection;
    (e) discrimination means for discriminating a track pitch in said tracks by using the binary signal; and
    (f) inhibiting means for inhibiting said tracking control means from operating in response to the binary signal.

2. An apparatus according to claim 1, further comprising transporting means for transporting said recording medium in a direction of crossing a longitudinal direction of said many tracks, and change-over means for changing a transporting speed at which said transporting means transports said recording medium from one speed over to another speed on the basis of the result of said discrimination made by said discrimination means.

3. An apparatus according to claim 1, wherein said discrimination means includes means for discriminating whether a generation pattern of said binary signals generated continuously timewise by said detecting means coincides with a given pattern.

4. An apparatus according to claim 1, wherein said inhibiting means is arranged to begin to operate when said tracking error is detected to be not within the predetermined range by said detecting means.

5. An apparatus according to claim 4, wherein said inhibiting means includes pulse generating means for generating a pulse signal every time said tracking error is detected to be not within said predetermined range by said detecting means, and means for detecting that said pulse signal has not been generated continuously over a predetermined period of time.

6. An apparatus for reproducing an information signal from a recording medium on which many tracks are formed, comprising:
    (a) reproducing means for reproducing the information signal from the recording medium, said reproducing means including a reproducing head which is arranged to periodically trace said recording medium;
    (b) transporting means for transporting said recording medium in a direction of crossing a longitudinal direction of said many tracks;
    (c) finding means for finding a tracking error of said reproducing head by using signals reproduced by said reproducing head;
    (d) tracking control means for controlling a position of said reproducing head relative to said recording medium on the basis of the tracking error currently found by said finding means;
    (e) detecting means for detecting whether the tracking error is within a predetermined range and for generating a binary signal indicative of the result of the detection;
    (f) change-over means for changing a transporting speed at which said transporting means transports said recording medium from one speed over to another by using the binary signal; and
    (g) inhibiting means for inhibiting said tracking control means from operating in response to the binary signal.

7. An apparatus for reproducing an information signal from a recording medium on which many tracks are formed, comprising:
    (a) reproducing means for reproducing the information signal from the recording medium, said reproducing means including a reproducing head which is arranged to periodically trace said recording medium;

(b) finding means for finding a tracking error of said reproducing head from one of said many tracks by using signals reproduced by said reproducing head;

(c) tracking control means for controlling a position of said reproducing head relative to said recording medium on the basis of the tracking error currently found by said finding means;

(d) detecting means for detecting whether the tracking error is within a predetermined range and for generating a binary signal indicative of the result of the detection;

(e) change-over means for changing a track for which the tracking error of said reproducing head is found by said finding means from one track to another track by using the binary signal; and (f) inhibiting means for inhibiting said tracking control means from operating in response to the binary signal.

* * * * *